United States Patent
Tsutsumi

(10) Patent No.: US 8,289,405 B2
(45) Date of Patent: Oct. 16, 2012

(54) IMAGE PROCESSING APPARATUS AND METHOD THEREOF

(75) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/813,268

(22) Filed: Jun. 10, 2010

(65) Prior Publication Data

US 2010/0321510 A1    Dec. 23, 2010

(30) Foreign Application Priority Data

Jun. 18, 2009  (JP) ................... 2009-145826

(51) Int. Cl.
*H04N 5/225*   (2006.01)
*G06K 9/40*    (2006.01)

(52) U.S. Cl. .............. 348/208.6; 382/255; 348/208.2

(58) Field of Classification Search .......... 382/255; 348/208.99, 208.2, 208.4, 208.6
See application file for complete search history.

(56) References Cited

U.S. PATENT DOCUMENTS

| | | | |
|---|---|---|---|
| 7,436,545 B2 | 10/2008 | Tomioka et al. | 358/1.9 |
| 7,756,354 B2 * | 7/2010 | Washisu | 382/274 |
| 8,130,278 B2 * | 3/2012 | Border et al. | 348/208.6 |
| 2007/0258706 A1 | 11/2007 | Raskar et al. | 396/52 |
| 2007/0258707 A1 * | 11/2007 | Raskar | 396/52 |
| 2010/0171840 A1 * | 7/2010 | Yonekura | 348/208.4 |
| 2010/0295953 A1 * | 11/2010 | Torii et al. | 348/208.4 |
| 2010/0321509 A1 * | 12/2010 | Torii | 348/208.4 |
| 2011/0081142 A1 * | 4/2011 | Tsai | 382/255 |

FOREIGN PATENT DOCUMENTS

JP   2006-074693   3/2006

* cited by examiner

*Primary Examiner* — Jason Whipkey
(74) *Attorney, Agent, or Firm* — Fitzpatrick, Cella, Harper & Scinto

(57) ABSTRACT

A plurality of images captured by an image capturing unit are input, and image blur of each of the plurality of images are corrected by coded exposure processing. Relative moving amounts between the plurality of deblurred images are calculated. Positions of the plurality of deblurred images are corrected based on the relative moving amounts. The plurality of images, on which the position correction is performed, are synthesized.

8 Claims, 20 Drawing Sheets

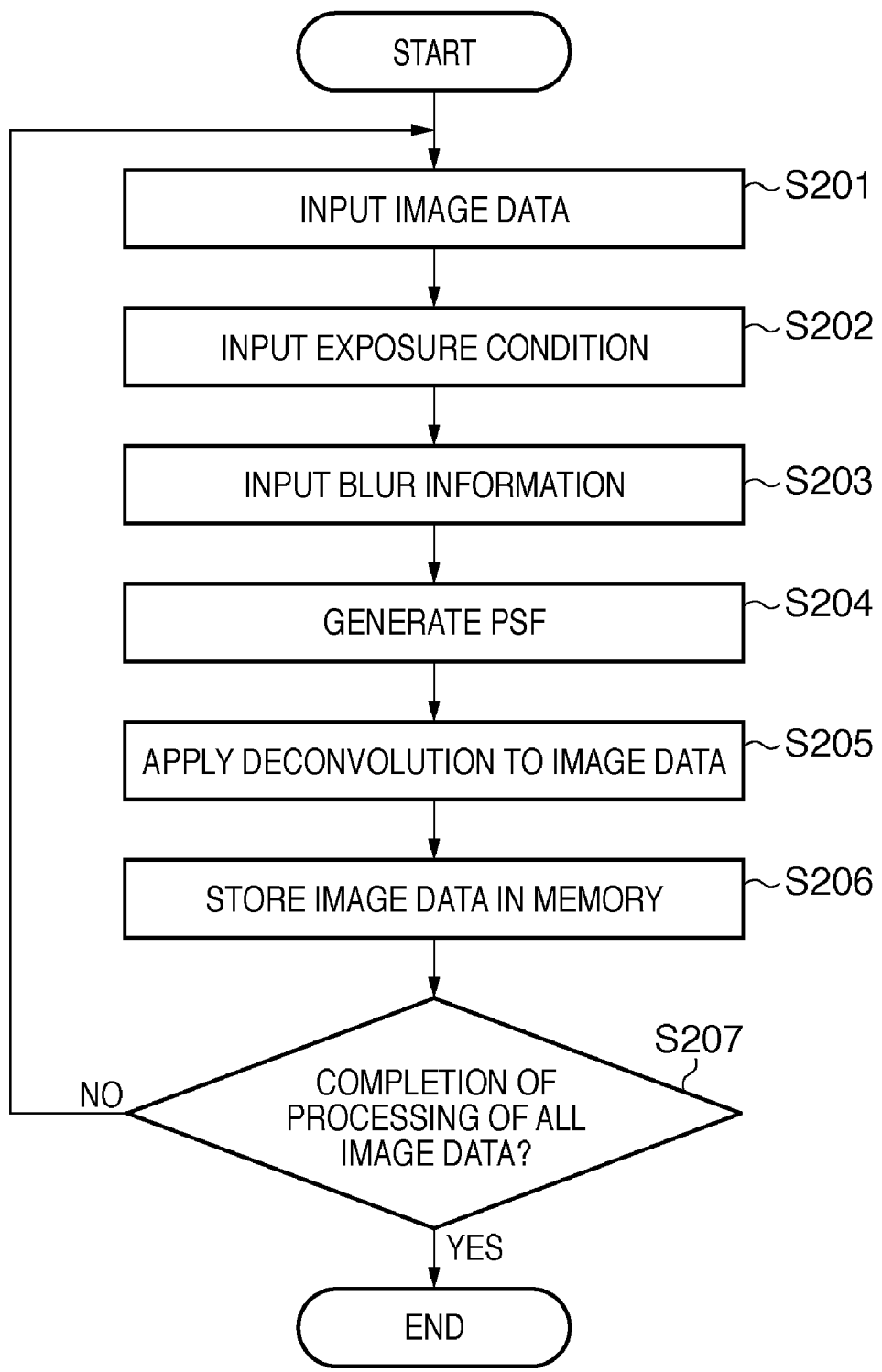

IMAGE PROCESSING APPARATUS AND METHOD THEREOF

BACKGROUND OF THE INVENTION

Field of the Invention

The present invention relates to image stabilization of captured image data.

Description of the Related Art

As the number of pixels and as the zoom ratio of image capturing apparatuses, such as digital cameras, increase, blurring of a captured image due to camera shaking poses a problem, and image capturing apparatuses with an image stabilization function have been widely used.

The image stabilization function normally is performed by a system which optically compensates for camera shaking by using a gyro sensor that detects an angular velocity caused by camera shaking and a driving device that controls the relative position between a lens and an image capturing device to compensate for camera shaking (to be referred to as an optical image stabilization system hereinafter).

Also, another system has been proposed (for example, Japanese Patent Laid-Open No. 2006-074693 (reference 1)). In this system, a plurality of images are continuously captured each for an exposure time free from the influence of camera shaking, that is, at a high shutter speed, and are synthesized by registering their positions, so as to generate an image free from the influence of camera shaking (to be referred to as a digital image stabilization system hereinafter). The digital image stabilization system does not require any gyro sensor, and can attain size and manufacturing cost reductions of an image capturing apparatus.

Furthermore, a technique which compensates for a blur by randomly opening and closing a shutter during an exposure period (to be referred to as a fluttered shutter hereinafter) and by deconvolution operations using information indicating opening and closing timings of the shutter (to be referred to as an fluttered shutter pattern hereinafter) has been proposed (for example, U.S. Patent Application publication No. 2007/0258706 (reference 2)). Since this technique called "coded exposure" corrects a blur by arithmetic operations, it does not require any registration of a plurality of images, as required in the technique of reference 1, thus decreasing the operation cost.

However, the technique of reference 1 assumes that the plurality of images do not include any blur. When a blurred image is included, the positions of the plurality of images often fail to be registered. For example, an imaging operation of a night scene requires an exposure time longer than or equal to a predetermined time so as to suppress noise in a captured image. However, when the exposure time is prolonged, each captured image is more likely to include a blur, and the positions of the plurality of images are more likely to fail to be registered.

The technique of reference 2 can correct image blur due to a blur generated in a certain direction, but it cannot correct image blur due to complicated blurs like movement of a person (to be referred to as a motion blur hereinafter). In other words, this technique can correct a blur caused by a uniform blur (including a motion blur of an object) for an entire image, but it cannot correct image blur caused by blurs including locally different blurs.

SUMMARY OF THE INVENTION

According to one aspect, an image processing apparatus comprises: an input section, configured to input a plurality of images captured by an image capturing unit; a restoration unit, configured to correct image blur of each of the plurality of images by coded exposure processing; a calculator, configured to calculate relative moving amounts between the plurality of deblurred images obtained by the restoration unit; and a synthesizing unit, configured to correct positions of the plurality of deblurred images based on the relative moving amounts, and to synthesize the plurality of images on which the position correction is performed.

According to the aspect, image blur caused by complicated blurs can be corrected.

Further features of the present invention will become apparent from the following description of exemplary embodiments with reference to the attached drawings.

BRIEF DESCRIPTION OF THE DRAWINGS

FIG. 3 is a flowchart for explaining restoration processing.

DESCRIPTION OF THE EMBODIMENTS

Image processing according to embodiments of the present invention will be described in detail hereinafter with reference to the drawings.

First Embodiment

[Apparatus Arrangement]

Figure 1:
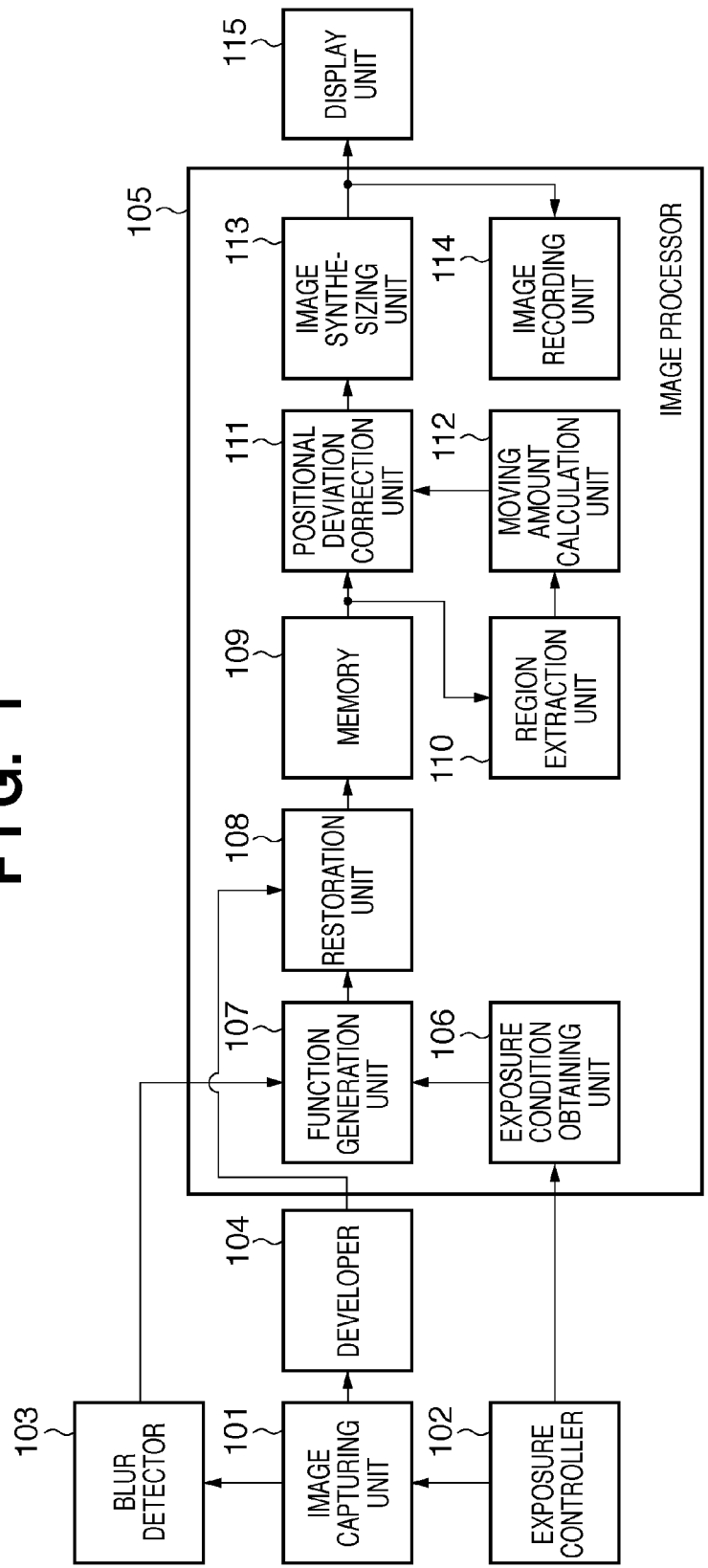
FIG. 1 is a block diagram showing the arrangement of an image capturing apparatus according to the first embodiment.

FIG. 1 is a block diagram showing the arrangement of an image capturing apparatus according to the first embodiment. Note that the image capturing apparatus can be either a digital still camera or a digital video camera.

An image capturing unit 101 has an imaging lens and an image capturing device such as a CMOS sensor or charge-coupled device (CCD). An exposure controller 102 controls a shutter and a stop. A blur detector 103 detects an orientation change of the image capturing apparatus. A developer 104 forms image data of an object by converting an analog signal output from the image capturing device into captured image data of a digital signal by analog-to-digital conversion (A/D) and executing, for example, demosaicing required to generate a luminance signal and color signals from the captured image data.

As will be described in detail later, an image processor 105 displays image data output from the developer 104 on a monitor of a display unit 115 or stores the image data in a recording medium via an image recording unit 114.

[Image Stabilization]

The image stabilization of this embodiment is configured by two stages of processes. That is, the image stabilization is implemented by processing for correcting a blur of a captured image by arithmetic operations (to be referred to as restoration processing hereinafter) and processing for calculating relative moving amounts of a plurality of images after the restoration processing, and synthesizing the images (to be referred to as synthesizing processing hereinafter).

Figure 2:
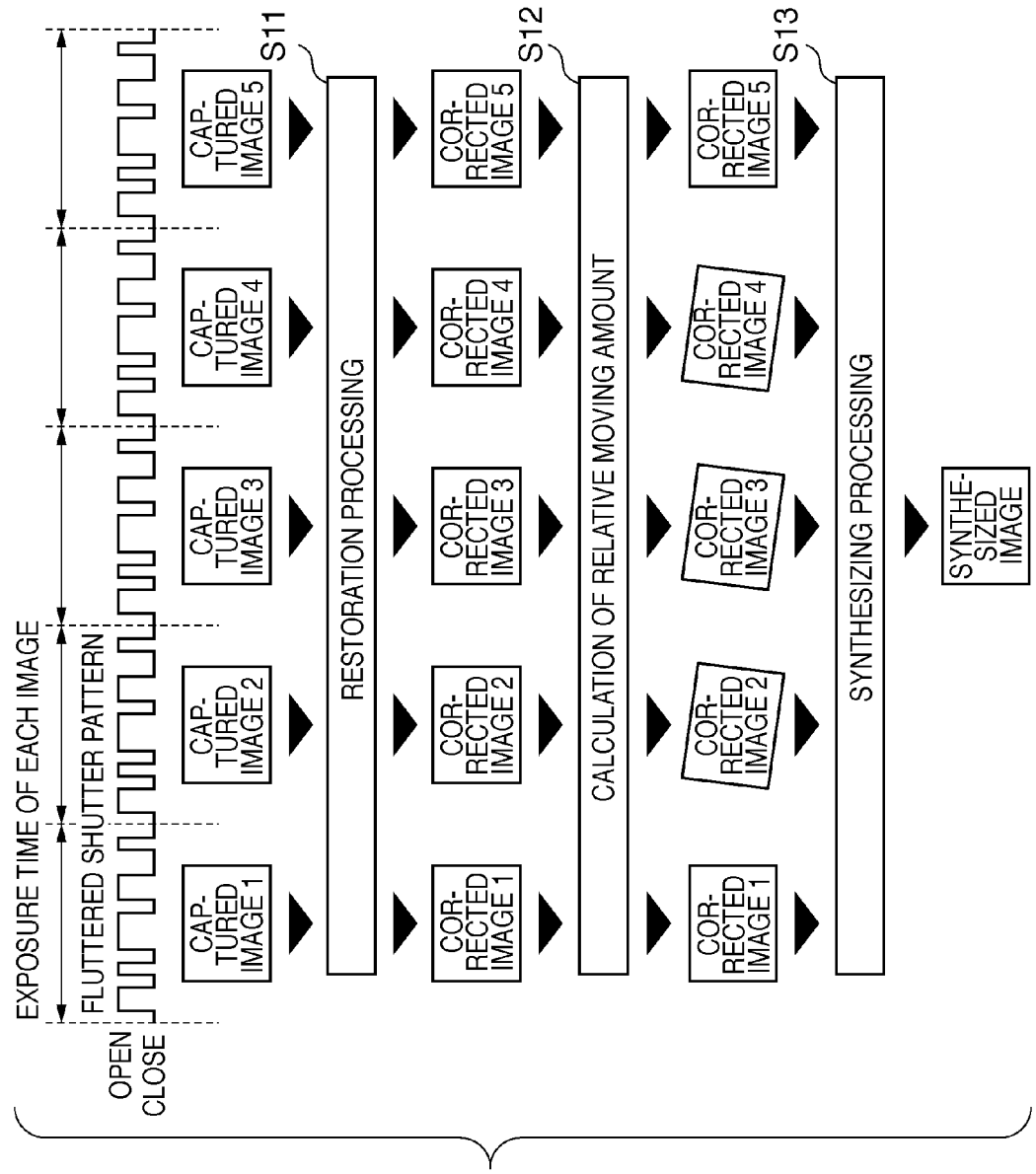
FIG. 2 is a view for illustrating an overview of image stabilization.

FIG. 2 shows an overview of the image stabilization. Initially, the restoration processing is applied to each of a series of images captured by a fluttered shutter (S11). Next, relative moving amounts indicating deviations between images that have undergone the image stabilization (to be referred to as positional deviations hereinafter) are calculated (S12). Then, the positional deviations of the respective images that have undergone the image stabilization are corrected based on the relative moving amounts, and the corrected images are synthesized to attain detailed image stabilization (S13).

The exposure controller 102 captures a plurality of images by controlling an exposure condition. This control is similar to an imaging operation generally called bracketing. Normal bracketing captures a plurality of images by varying an exposure condition to have an appropriate exposure condition as the center. In this embodiment, in order to obtain an appropriate exposure amount by synthesizing a plurality of images, the exposure time of each image is shorter than that of bracketing.

A function generation unit 107 inputs an orientation change of the image capturing apparatus during a capturing period of each image from the blur detector 103, inputs a fluttered shutter pattern of each image set by the exposure controller 102 from an exposure condition obtaining unit 106, and generates a function used in the image stabilization. A restoration unit 108 sequentially applies image stabilization to each of a plurality of image data input from the developer 104 using the function generated by the function generation unit 107. The plurality of image data which have undergone the image stabilization are temporarily stored in a memory 109.

The plurality of images which have undergone the image stabilization by the restoration unit 108 may have positional deviations from each other. As will be described in detail later, a positional deviation correction unit 111 corrects relative positional deviations between the plurality of images, and an image synthesizing unit 113 selects pixels from the plurality of images to synthesize the plurality of images. In this case, a region extraction unit 110 executes pre-processing for enhancing detection precision upon detecting positional deviations between the plurality of images. That is, the region extraction unit 110 calculates common regions having a correct range from the plurality of images, and prevents determination errors in positional deviation detection.

[Restoration Processing]

FIG. 3 is a flowchart for explaining the restoration processing. The restoration unit 108 inputs image data from the developer 104 (S201). Letting I(x, y) be an intensity of incident light per unit time for a pixel (x, y), letting v be an orientation change velocity of the image capturing apparatus, and letting T be an exposure time, information indicating I(x, y) moved by vT enters the image capturing apparatus at time t. Therefore, image data $I_{blur}(x, y)$ to be captured is expressed by:

$$I_{blur}(x,y)=1/T\int_{t=0}^{T}(x,y+vt)h(t)dt \quad (1)$$

where a function h(t) expresses exposure timings of the shutter: shutter open=1; and shutter close=0.

Note that in a case that will be explained below a blur in a longitudinal direction (y-direction) has been generated for the sake of simplicity.

The exposure condition obtaining unit 106 inputs data representing an exposure condition from the exposure controller 102 (S202). The exposure condition includes the exposure time T and h(t) indicating the fluttered shutter pattern. Subsequently, the function generation unit 107 inputs blur information indicating an orientation change of the image capturing apparatus from the blur detector 103 (S203). The blur information includes vectors that represent moving velocities of the image capturing apparatus in x- and y-directions. The function generation unit 107 inputs the exposure condition and the blur information, generates a point spread function (PSF) that represents a blur of a captured image, as will be described in detail later, and generates a function used in the image stabilization (S204).

Next, the restoration unit 108 applies deconvolution using the function generated by the function generation unit 107 to the image data (S205). As a deconvolution algorithm, an existing arbitrary algorithm may be used. For example, a division on a frequency domain, a Lucy-Richardson algorithm, an algorithm using a Wiener filter, an algorithm using a regularization filter, and the like are available. In this embodiment, assume that the division on the frequency domain is made by controlling the fluttered shutter pattern, as will be described in detail later.

Next, the restoration unit 108 stores the image data that has undergone the restoration processing in a predetermined area of the memory 109 (S206), and determines whether or not the restoration processing for a series of captured image data is complete (S207). If the restoration processing is not complete yet, the process returns to step S201 to input next image data, thus repeating the aforementioned restoration processing.

Generation of Function

The function generation unit 107 generates a deconvolution function which is used in image stabilization. Deconvolution operations on a real space can be described in the form of products on spatial frequencies. A Fourier transform of equation (1) which expresses the image capturing process of image data yields:

$$I_{blur}(u,v)=1/(vT)\cdot I(u,v)H(u) \quad (2)$$

where u and v are spatial frequencies.

Next, a transform of equation (2) for I(u, v) which represents an image free from any blur yields:

$$I(u,v)=vT/H(u) \cdot I_{blur}(u,v) \quad (3)$$

where $I_{blur}(u, v)$ is a Fourier transform of image data $I_{blur}(x, y)$.

That is, the function to be generated by the function generation unit 107 is vT/H(u). Note that H(u) is a Fourier transform of the fluttered shutter pattern h(t) included in the exposure condition, and the velocity v and exposure time T are respectively obtained from the blur detector 103 and the exposure condition obtaining unit 106.

The restoration unit 108 performs the arithmetic operation given by equation (3) on a frequency domain, thereby obtaining the Fourier transform I(u, v) of image data in which a blur is corrected. However, depending on the fluttered shutter pattern h(t), its Fourier transform H(u) may assume a zero value, and a division by zero may occur in the arithmetic operation given by equation (3).

Figure 4A:
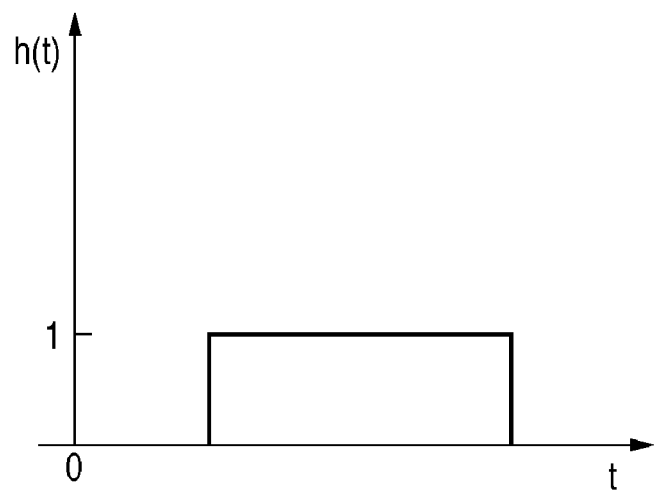
FIGS. 4A and 4B are graphs illustrating the occurrence of a division by zero.
Figure 4B:
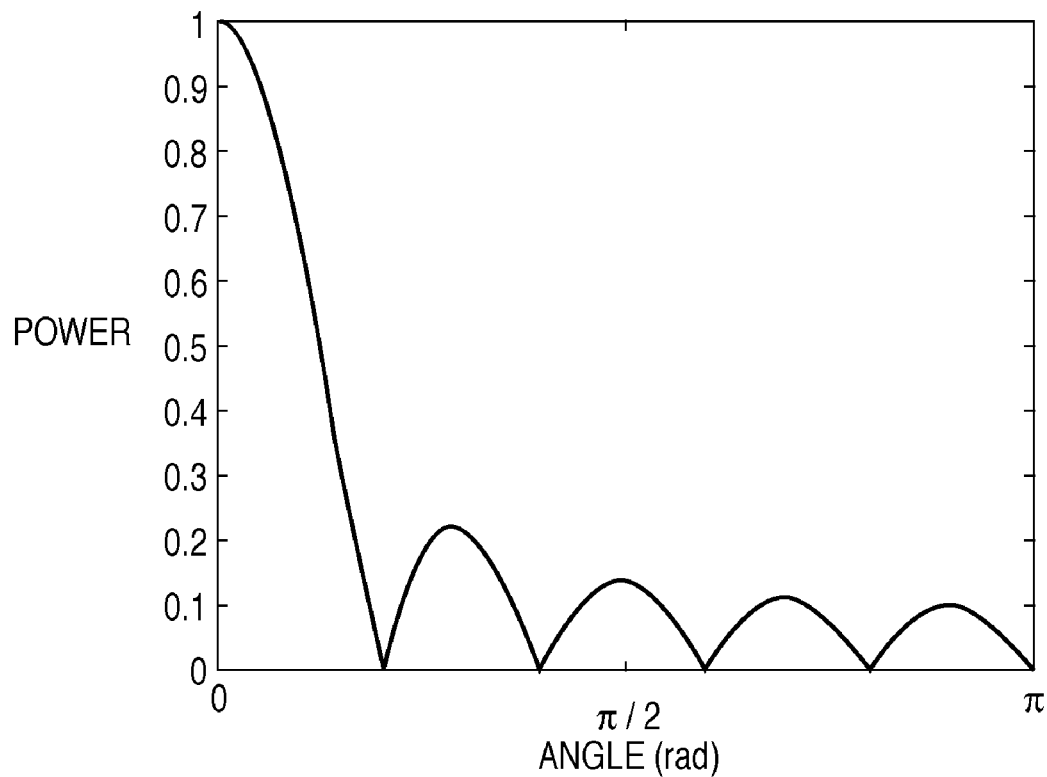

FIGS. 4A and 4B are views for explaining occurrence of a division by zero. FIG. 4A shows h(t) which assumes h(t)=1 when 0≦t≦T as a normal exposure condition and h(t)=0 for other cases (the shutter is continuously open during a shutter open period in place of the fluttered shutter). FIG. 4B shows the Fourier transform (frequency characteristics) of h(t) shown in FIG. 4A. Note that in FIG. 4A, the abscissa plots time t, and the ordinate plots opening and closing timings of the shutter. In FIG. 4B, the abscissa plots an angle (rad), and the ordinate plots the absolute value (intensity) of a frequency component.

As shown in FIG. 4B, when the shutter is continuously open, frequencies whose intensity becomes zero appear cyclically. This means that information corresponding to that frequency is lost, and when the deconvolution is performed in such state, a waveform (pattern) corresponding to the existence of frequencies whose information is lost appears. Thus, in order to prevent the occurrence of frequencies whose information is lost, coded exposure processing is executed. In other words, in order to prevent the occurrence of frequencies whose intensity becomes zero, the fluttered shutter is implemented by randomly controlling the opening and closing timings and an open (or close) duration during an exposure period.

Figure 5A:
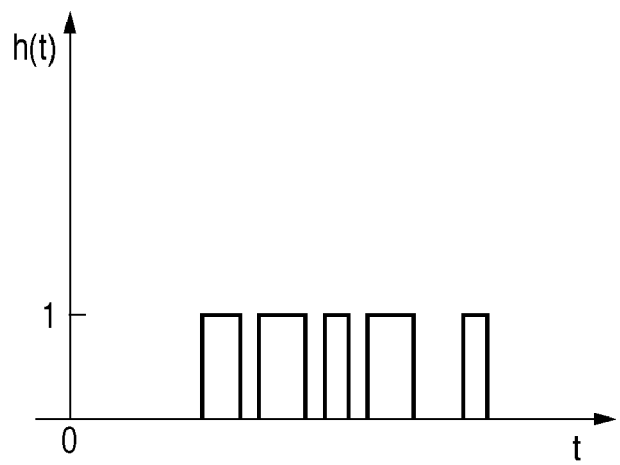
FIGS. 5A and 5B are graphs showing h(t) and its frequency characteristics when coded exposure processing is executed.
Figure 5B:
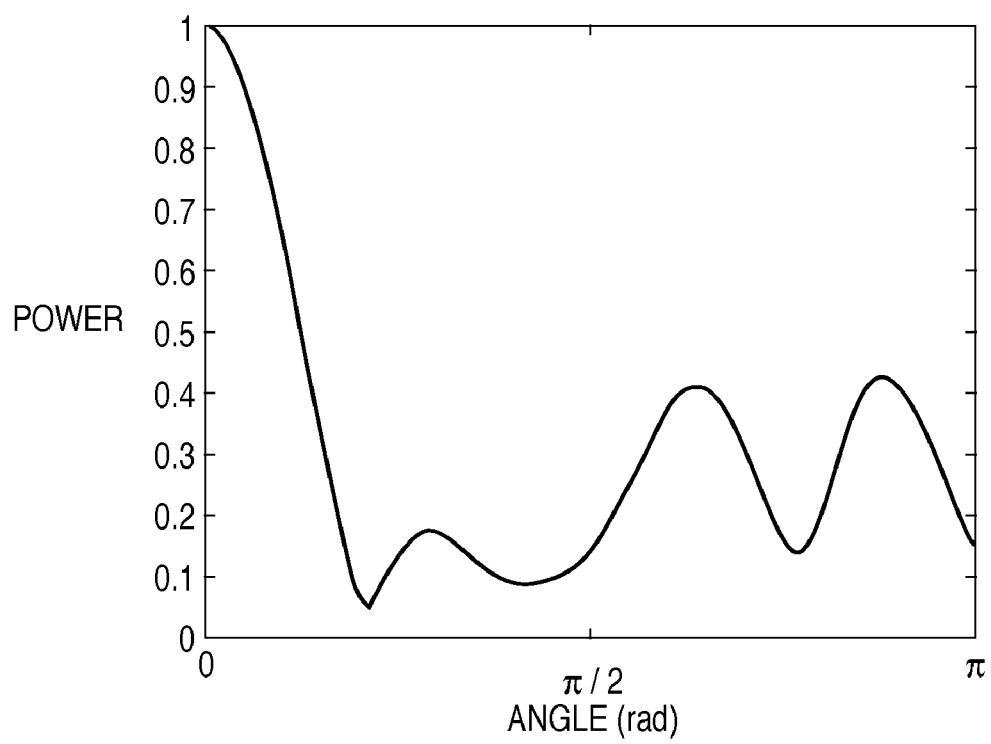

FIGS. 5A and 5B show h(t) and its frequency characteristics when the coded exposure processing is executed. When the coded exposure processing shown in FIG. 5A is executed, no frequencies whose information is lost appear, as shown in FIG. 5B, thus allowing the restoration processing by the deconvolution operation given by equation (3).

Note that the above example has described correction of a longitudinal blur. Also, a lateral blur in a lateral direction, and a blur in an oblique direction as a combination of longitudinal and lateral blurs (to be collectively referred to as a "shift blur" hereinafter) can also be corrected. When image data is converted into that on a polar coordinate system, and the restoration processing is applied, a blur due to a rotation of the image capturing apparatus to have the optical axis of the imaging lens as the center (to be referred to as a rotation blur hereinafter) can also be corrected.

[Synthesizing Processing]

Figure 6:
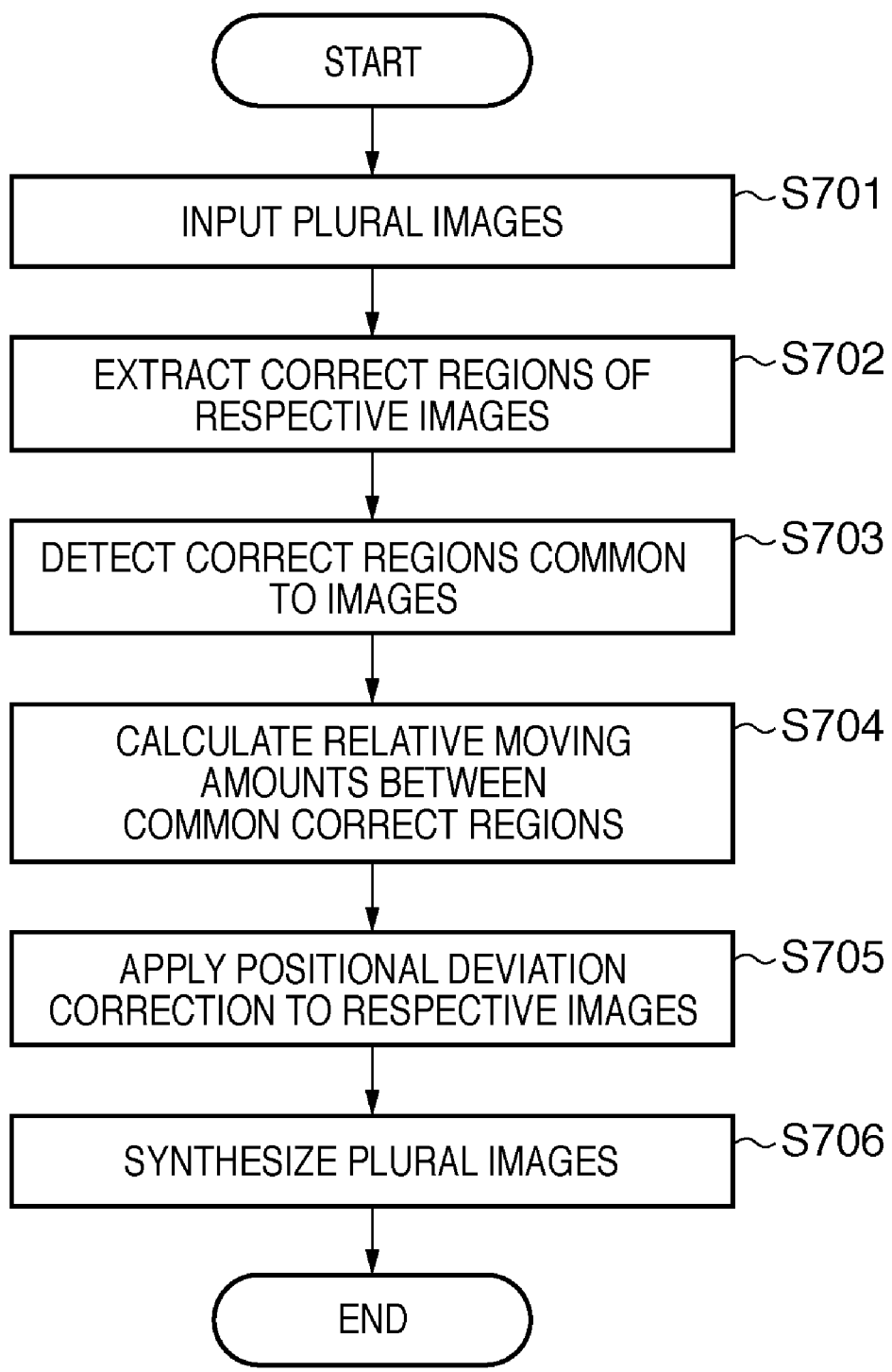
FIG. 6 is a flowchart for explaining synthesizing processing.

FIG. 6 is a flowchart for explaining the synthesizing processing. The region extraction unit 110 inputs a plurality of images that have undergone the restoration processing from the memory 109 (S701), and extracts correct regions from the respective images (S702). Furthermore, the unit 110 detects correct regions common to the images (to be referred to as common regions hereinafter) (S703).

A moving amount calculation unit 112 calculates a relative moving amount between the common regions (S704). The positional deviation correction unit 111 applies correction processing for the calculated relative moving amounts to the respective images (S705). For example, when there are two images, the second image of a later imaging order may be corrected to be registered to the first image, or vice versa.

If the image synthesizing unit 113 completes the positional deviation correction (registration) of the plurality of images, it executes synthesizing processing of these images (S706). Note that the synthesizing processing of images is attained by additions.

Extraction of Correct Region

An image which has an exposure amount smaller than an appropriate exposure amount (underexposure image) often suffers a region where tones are not reproduced in a dark portion, that is, so-called a shadow-detail loss. Likewise, an image which has an exposure amount larger than a correct exposure amount (overexposure image) often suffers a region where tones are not reproduced in a bright portion, that is, so-called a highlight-detail loss. Since image features are lost in a shadow-detail loss region and a highlight-detail loss region, if these regions are selected as calculation targets of a relative moving amount, a positional deviation is likely to be erroneously determined. Hence, a correct region is extracted from a region except for the shadow-detail loss region and the highlight-detail loss region as a region suited to calculate the relative moving amount.

Figure 7:
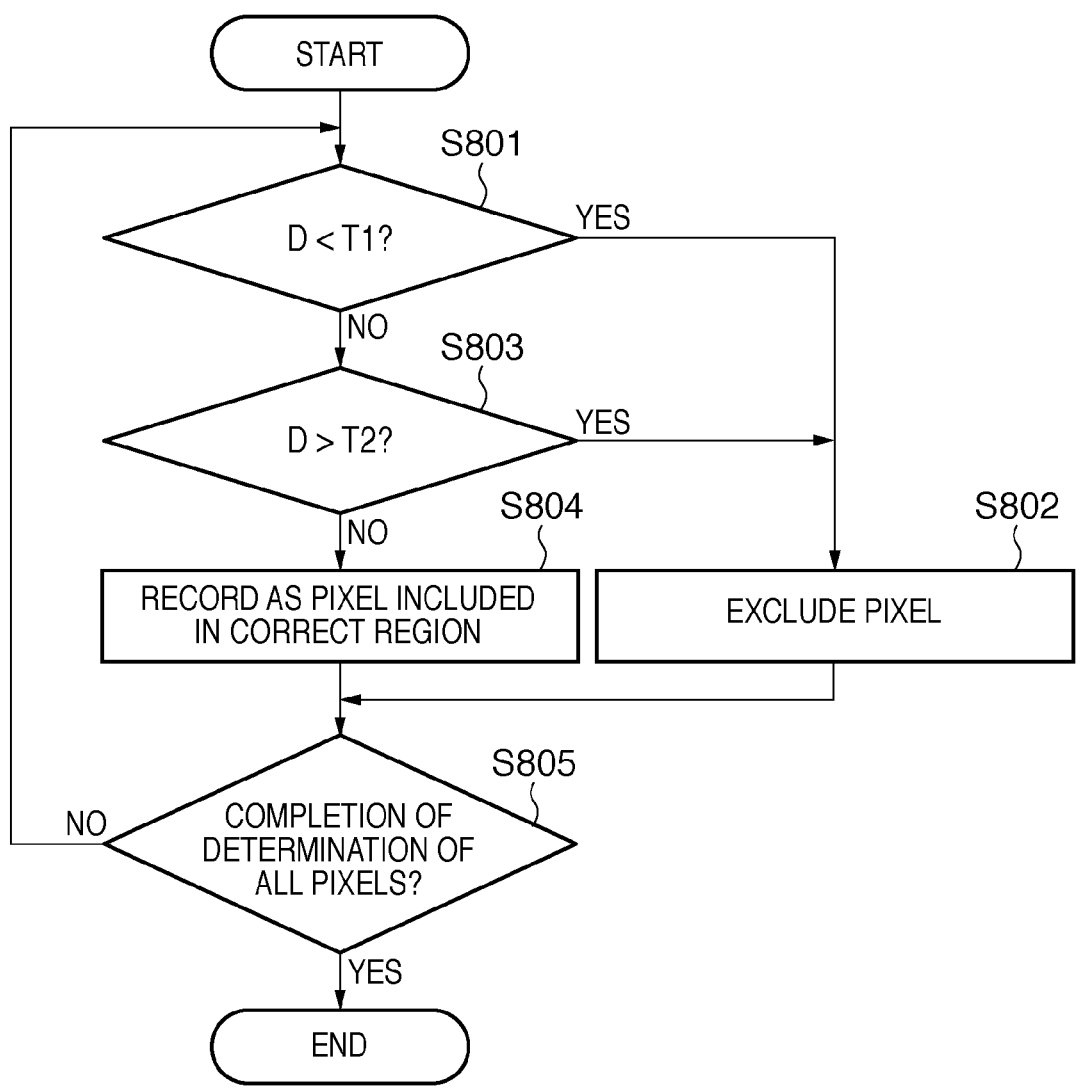
FIG. 7 is a flowchart for explaining correct region extraction processing.

FIG. 7 is a flowchart for explaining the correct region extraction processing (S702), and shows processing for one image. In order to exclude a shadow-detail loss region, the region extraction unit 110 compares a value D of a pixel of interest of an image with a predetermined threshold T1 (S801). If D<T1, the unit 110 determines that the pixel of interest is included in the shadow-detail loss region, and excludes that pixel from a relative moving amount calculation region (S802). In order to exclude a highlight-detail loss region, the region extraction unit 110 compares the value D of the pixel of interest of the image with a predetermined threshold T2 (S803). If D>T2, the unit 110 determines that the pixel of interest is included in the highlight-detail loss region, and excludes that pixel from the relative moving amount calculation region (S802).

The region extraction unit 110 determines the pixel of interest which is not excluded by the determination processes in steps S801 and S803, that is, the pixel which satisfies T1≦D≦T2 as a pixel included in a correct region (to be referred to as a correct pixel hereinafter), and records its position (S804). Then, the unit 110 repeats the aforementioned processes until it is determined in step S805 that the aforementioned determination processes are complete for all pixels of the image.

Detection of Common Region

Figure 8:
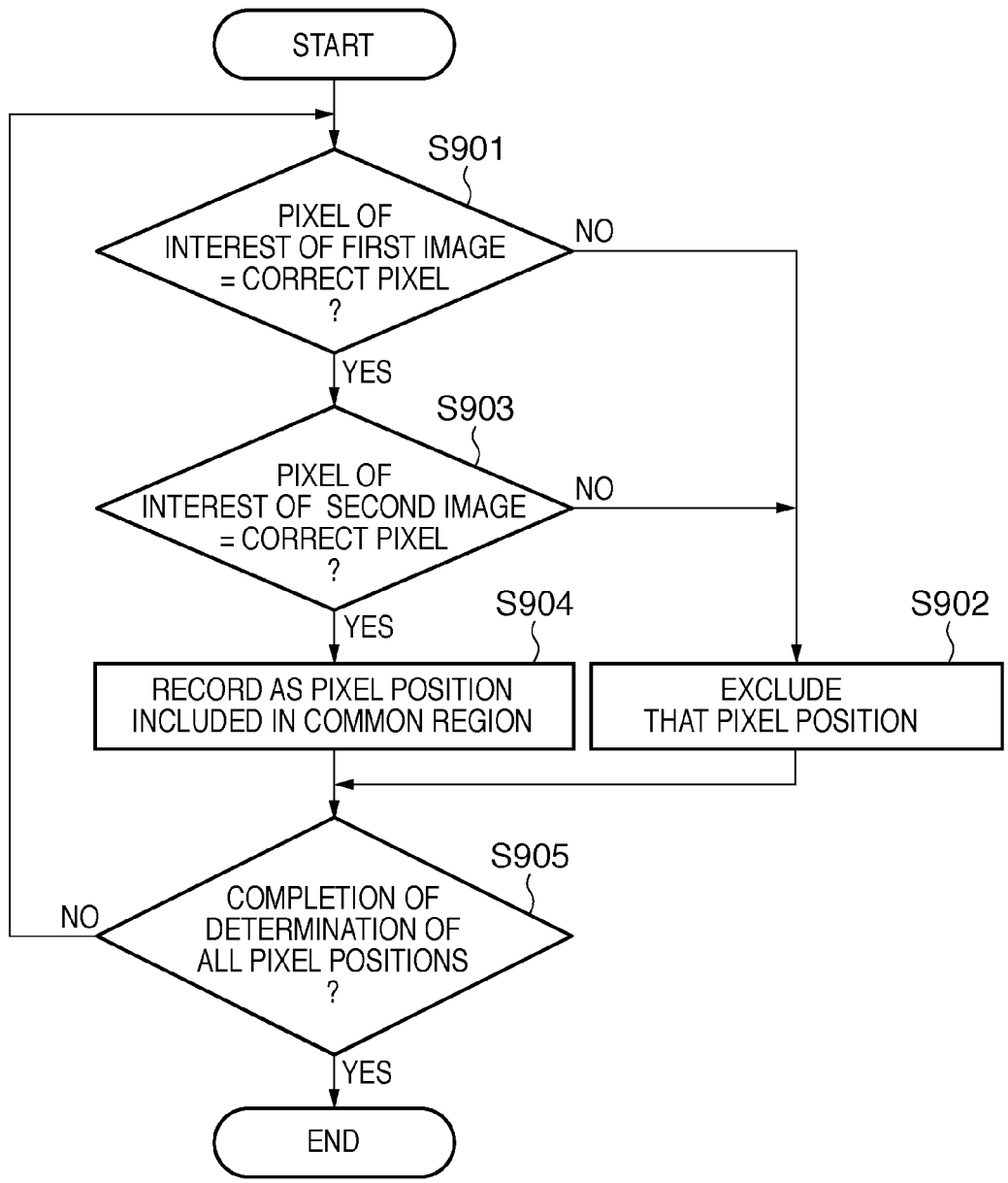
FIG. 8 is a flowchart for explaining common region detection processing.

FIG. 8 is a flowchart for explaining the common region detection processing (S703). The common region detection processing is that to be executed among a large number of images. However, for the sake of descriptive simplicity, processing between two images will be described below.

The region extraction unit 110 determines whether or not a pixel of interest of a first image is a correct pixel (S901). If the pixel of interest is not a correct pixel, the unit 110 excludes that pixel position from the relative moving amount calculation region (S902). Then, the region extraction unit 110 determines whether or not a pixel of interest of a second image (which is located at the same position as the pixel of interest of the first image) is a correct pixel (S903). If the pixel of interest is not a correct pixel, the unit 110 excludes that pixel position from the relative moving amount calculation region (S902).

The region extraction unit 110 records a pixel position which is not excluded by the determination processes in steps S901 and S903, that is, where both the pixels of the first and second images at the same position are correct pixels, as a pixel position included in a common region (S904). Then, the unit 110 repeats the aforementioned processes until it is determined in step S905 that the aforementioned determination processes are complete for all pixel positions of the images.

In this way, a common region between a pair of images is extracted. Upon detection of a common region for a third image, the processing shown in FIG. 8 can be executed between the detection result of the common region between the first and second images, and the third image. In other words, upon detection of a common region for the Nth image, the processing shown in FIG. 8 can be executed between the detection result of the common region among the first to (N−1)th images, and the Nth image.

Figure 9:
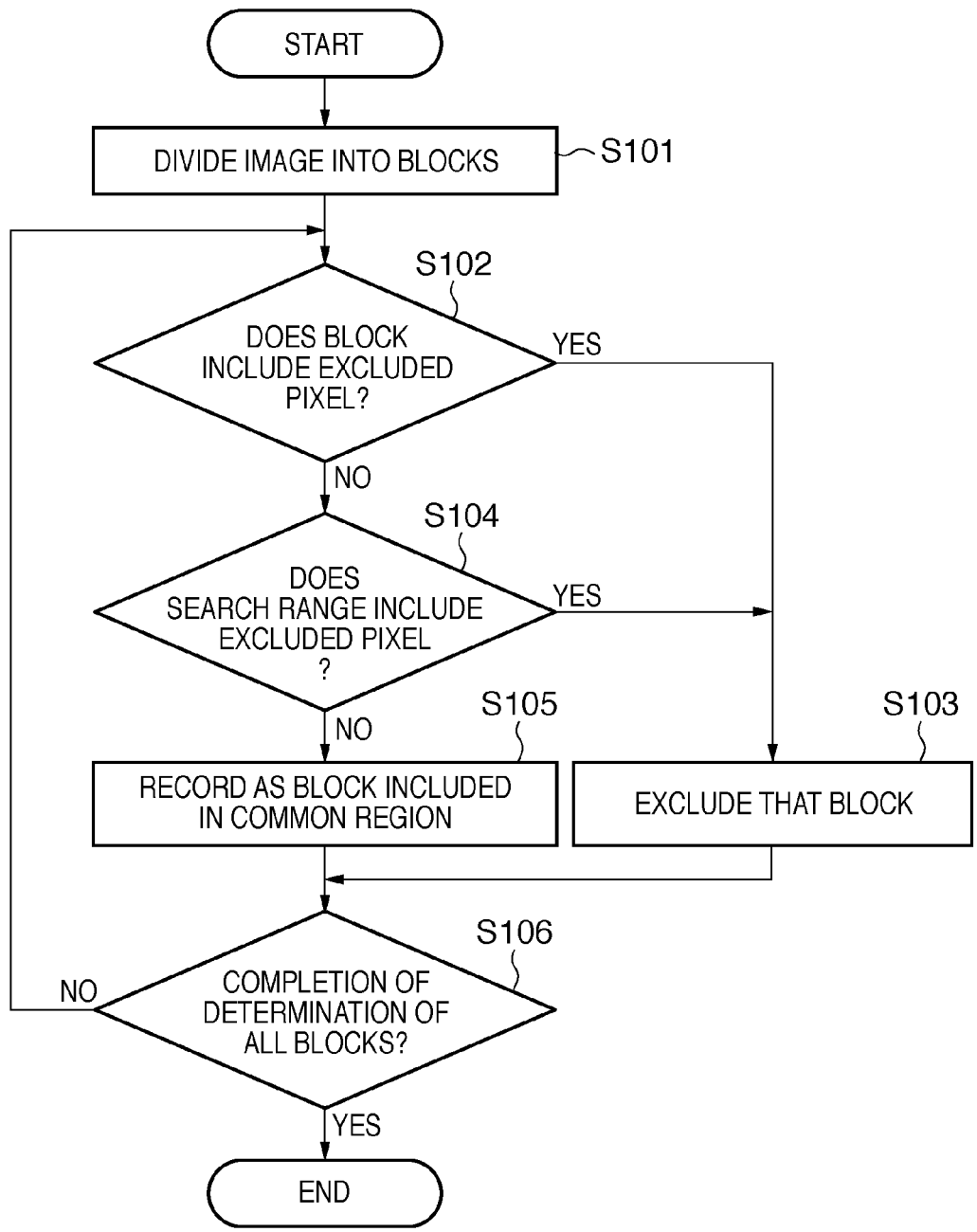
FIG. 9 is a flowchart for explaining the second example of the common region detection processing.

FIG. 9 is a flowchart for explaining the second example of the common region detection processing (S703). This method enhances the detection precision when a positional deviation is detected for respective blocks, and detects a common region narrower than that obtained by the method shown in FIG. 8.

The region extraction unit 110 divides each of a plurality of images into blocks each having a predetermined size (M×N pixels) (S101). Then, the region extraction unit 110 determines whether or not blocks of interest (respective blocks are located at the same position) of the plurality of images include a pixel excluded from the relative moving amount calculation region (to be referred to as an excluded pixel hereinafter) (S102). If the block of interest of one of the images includes the excluded pixel, the unit 110 excludes that block from the relative moving amount calculation region (S103).

If the blocks of interest of the respective images do not include any excluded pixel, the region extraction unit 110 determines whether or not a search range outside the block includes an excluded pixel (S104). If the search range includes an excluded pixel, the unit 110 excludes that block from the relative moving amount calculation region (S103).

The region extraction unit 110 records blocks which are not excluded by the determination processes in steps S102 and S103, that is, those which do not include any excluded pixel and whose search range does not include any excluded pixel, either, as those included in a common region (S105). Then, the unit 110 repeats the aforementioned processes until it is determined in step S106 that the aforementioned determination processes are complete for all blocks.

[Calculation of Relative Moving Amount]

Figure 10:
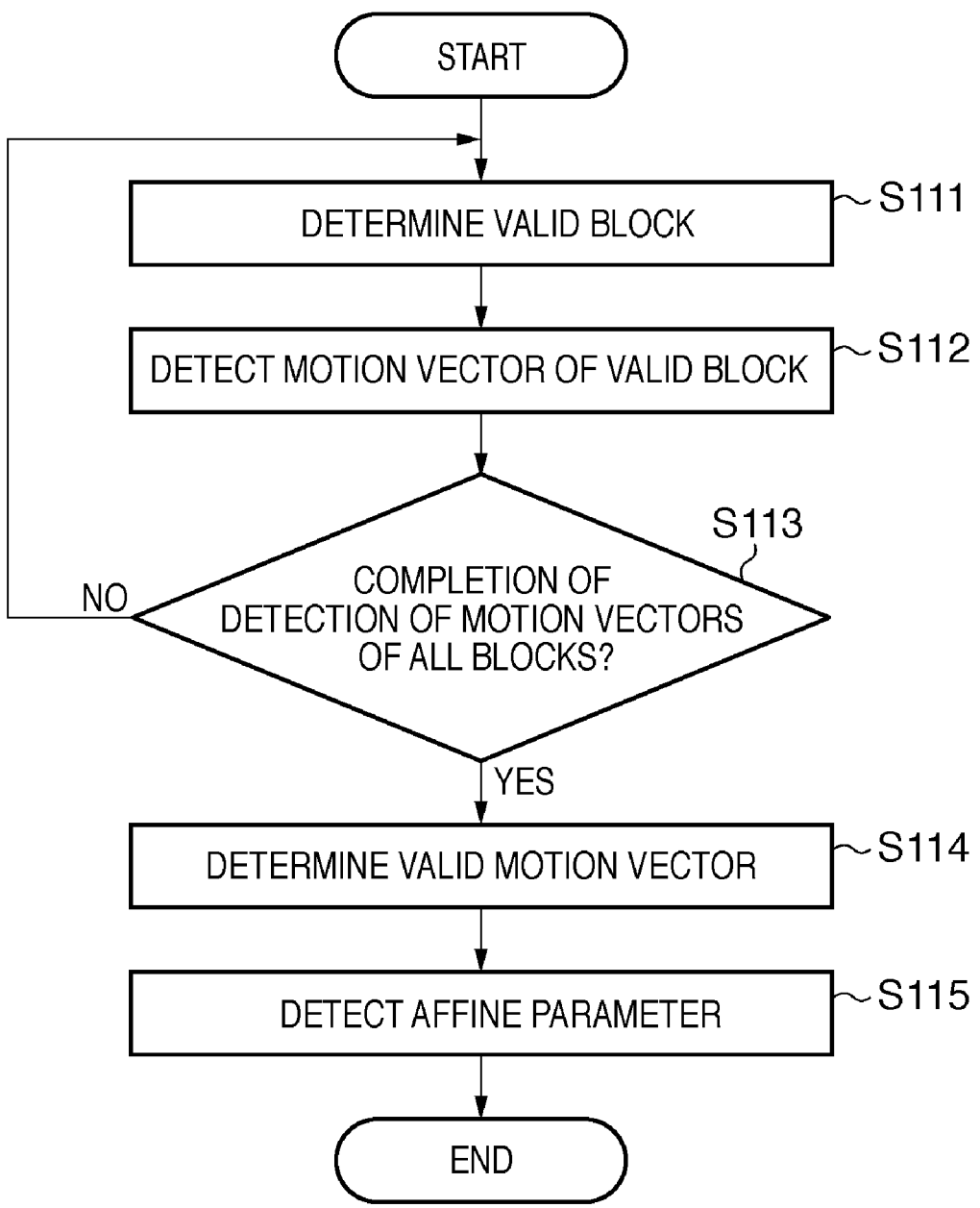
FIG. 10 is a flowchart for explaining relative moving amount calculation processing.

FIG. 10 is a flowchart for explaining the relative moving amount calculation processing (S704). Note that this embodiment will explain a method for calculating motion vectors for respective blocks, and then calculating a moving amount of the entire image as affine parameters from the motion vectors.

The moving amount calculation unit 112 determines valid blocks as pre-processing for calculating a motion vector for each block (S111). As will be described in detail later, a block for which a correct motion vector is unlikely to be calculated is excluded. Then, the moving amount calculation unit 112 detects a motion vector for each valid block by block matching (S112).

The block matching uses, as an evaluation value of matching, a difference square sum or difference absolute value sum between pixels. That is, evaluation values are calculated while sequentially moving a motion vector calculation target block within a search range of a reference image. A block corresponding to the moving position of the calculation target block which yields a minimum evaluation value of all the evaluation values calculated within the search range is that which has a highest correlation with the calculation target block, and a vector which connects the two blocks is a motion vector. A method of calculating evaluation values while moving a calculation target block pixel by pixel is called "full search". Also, a method of calculating evaluation values while moving a calculation target block by every several pixels, and also calculating evaluation values while moving the calculation target block more finely (e.g., pixel by pixel) near a moving position where a minimum evaluation value is obtained is called "step search". The step search can detect motion vectors at high speed.

The moving amount calculation unit 112 determines whether or not motion vectors are calculated for all blocks (S113). If NO in step S113, the process returns to step S111. If motion vectors are detected for all blocks, the moving amount calculation unit 112 determines valid motion vectors (S114). As will be described in detail later, the unit 112 excludes motion vectors whose detection results are determined to be incorrect of the detected motion vectors. Then, the unit 112 detects affine parameters from the valid motion vectors (S115).

Figure 11:
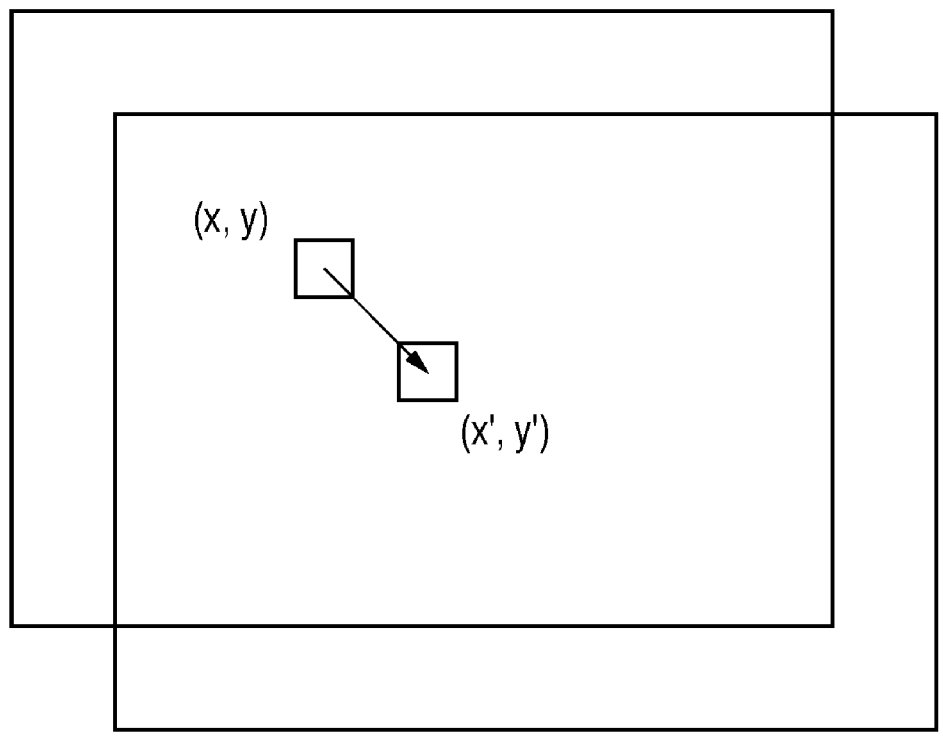
FIG. 11 is a view for explaining affine parameter detection processing.

FIG. 11 is a view for explaining the affine parameter detection processing. If the central coordinates of a target block are (x, y), and the central coordinates of a corresponding block in a reference image are (x', y') based on the motion vector detection result, the relationship between these blocks can be expressed by:

$$\begin{bmatrix} x' \\ y' \\ 1 \end{bmatrix} = \begin{bmatrix} a & b & c \\ d & e & f \\ 0 & 0 & 1 \end{bmatrix} \begin{bmatrix} x \\ y \\ 1 \end{bmatrix} \quad (4)$$

A 3×3 matrix in equation (4) is an affine matrix. Respective elements of the matrix are affine parameters, a case of coefficients a=1, b=0, d=0, and e=1 expresses a transform of a translation, a coefficient c represents a moving amount in the horizontal direction, and a coefficient f represents a moving amount in the vertical direction. A rotation motion through a rotation angle θ can be expressed by coefficients a=cos θ, b=−sin θ, d=sin θ, and e=cos θ. A general expression of equation (4) is described as:

$$X' = A \cdot X \quad (5)$$

where X and X' are 1×3 matrices, and
A is a 3×3 matrix.

If there are n valid motion vectors, coordinate values of a target image can be expressed by an n×3 matrix, as described by:

$$X = (X^1 X^2 \ldots X^n) \quad (6)$$

Likewise, coordinate values after movement can be expressed by an n×3 matrix, as described by:

$$X' = (X^{1'} X^{2'} \ldots X^{n'}) \quad (7)$$

Therefore, for n motion vectors, we have the following expression:

$$X' = A \cdot X \quad (8)$$

That is, by calculating an affine matrix A in equation (8), it corresponds to a relative moving amount. By deforming equation (8), the affine matrix is expressed by:

$$A = X' \cdot X^T \tag{9}$$

where T is a transposed matrix.

In this way, since a moving amount is expressed by parameters of the affine transformation (affine matrix), a rotation blur and a blur in a back-and-forth direction (to be referred to as a zoom blur hereinafter) can be covered in addition to a shift blur such as camera shaking.

Determination of Valid Blocks

Figure 12:
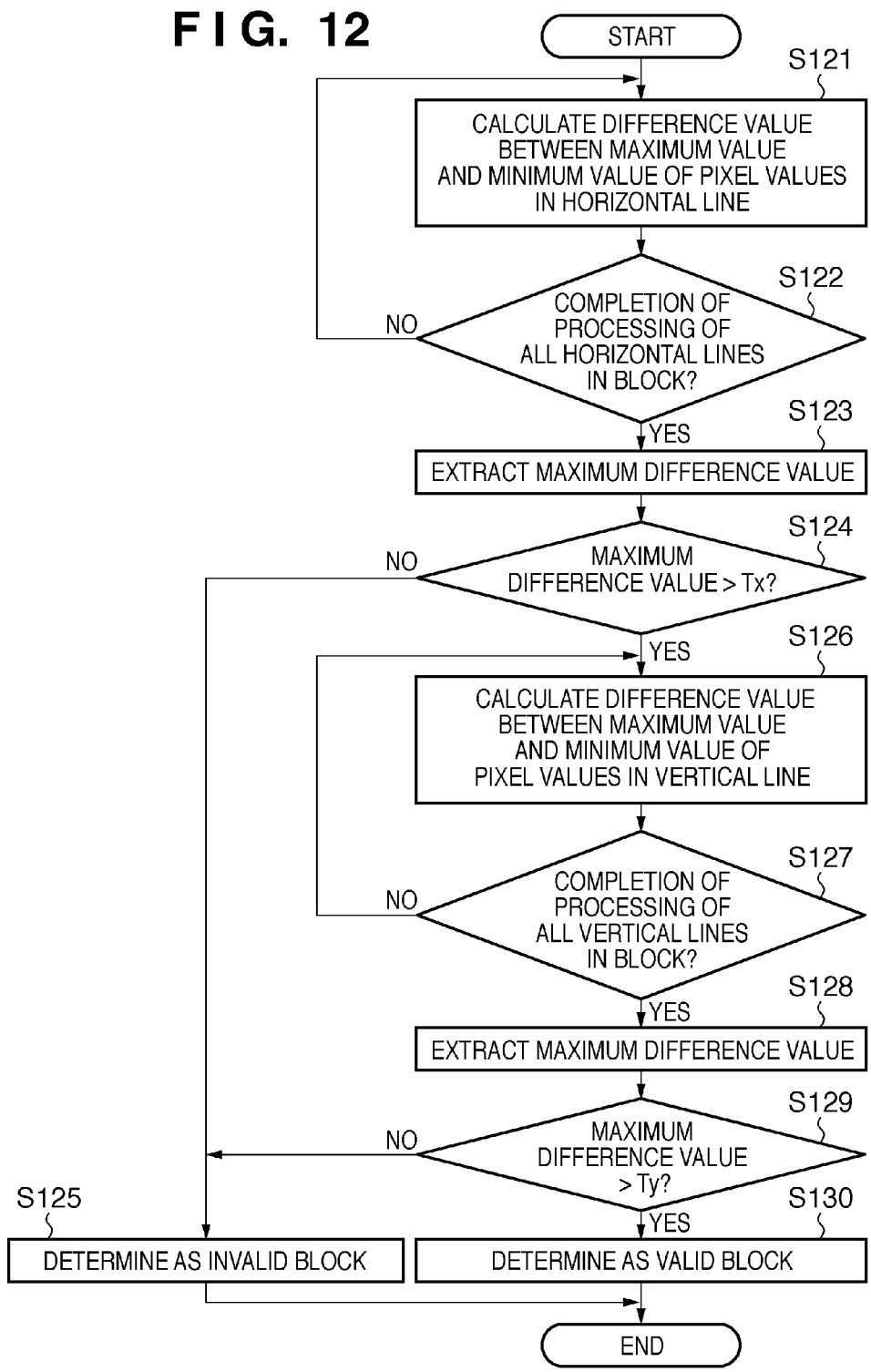
FIG. 12 is a flowchart for explaining a method of determining a valid block by excluding a flat block.

Upon calculating a correlation between blocks by block matching, an image in each block has to include an arbitrary feature amount. For a flat block, most components of which are DC components, a normal motion vector cannot be calculated. Conversely, when a block includes an edge in the horizontal or the vertical direction, matching is easy. FIG. 12 is a flowchart for explaining a method of determining a valid block by excluding a flat block (S112), and shows determination processing for one block.

The moving amount calculation unit 112 calculates a difference value between maximum and minimum values of pixel values for each horizontal line in a block (S121). For example, if a block has a 50×50 pixel size, maximum and minimum values are extracted from 50 pixels in the horizontal direction, and their difference value is calculated. By repeating the difference value calculation processing as many times as the number of horizontal lines (50 times in this example) until YES is determined in step S122, a maximum difference value is extracted (S123). The unit 112 compares a predetermined threshold Tx and the maximum difference value (S124). If the maximum difference value ≦Tx, the unit 112 determines that the block has no feature amount in the horizontal direction, and records that block as an invalid block (S125).

If the maximum difference value >Tx, the moving amount calculation unit 112 determines that the block has a feature amount in the horizontal direction, and executes the same determination processing in the vertical direction. That is, the moving amount calculation unit 112 calculates a difference value between maximum and minimum values of pixels for each vertical line in the block (S126), and repeats the difference value calculation processing as many times as the number of vertical lines (50 times in this case) until YES is determined in step S127, thereby extracting a maximum difference value (S128). Then, the unit 112 compares a predetermined threshold Ty and the maximum difference value (S129). If the maximum difference value ≦Ty, the unit 112 determines that the block has no feature amount in the vertical direction, and records that block as an invalid block (S125).

If the maximum difference value >Ty, the moving amount calculation unit 112 determines that the block has feature amounts in the vertical and horizontal directions, and records that block as a valid block (S130). That is, for a block having feature amounts in both the horizontal and the vertical directions, accurate block matching can be expected, and such block is determined as a valid block.

Determination of Valid Motion Vector

Figure 13:
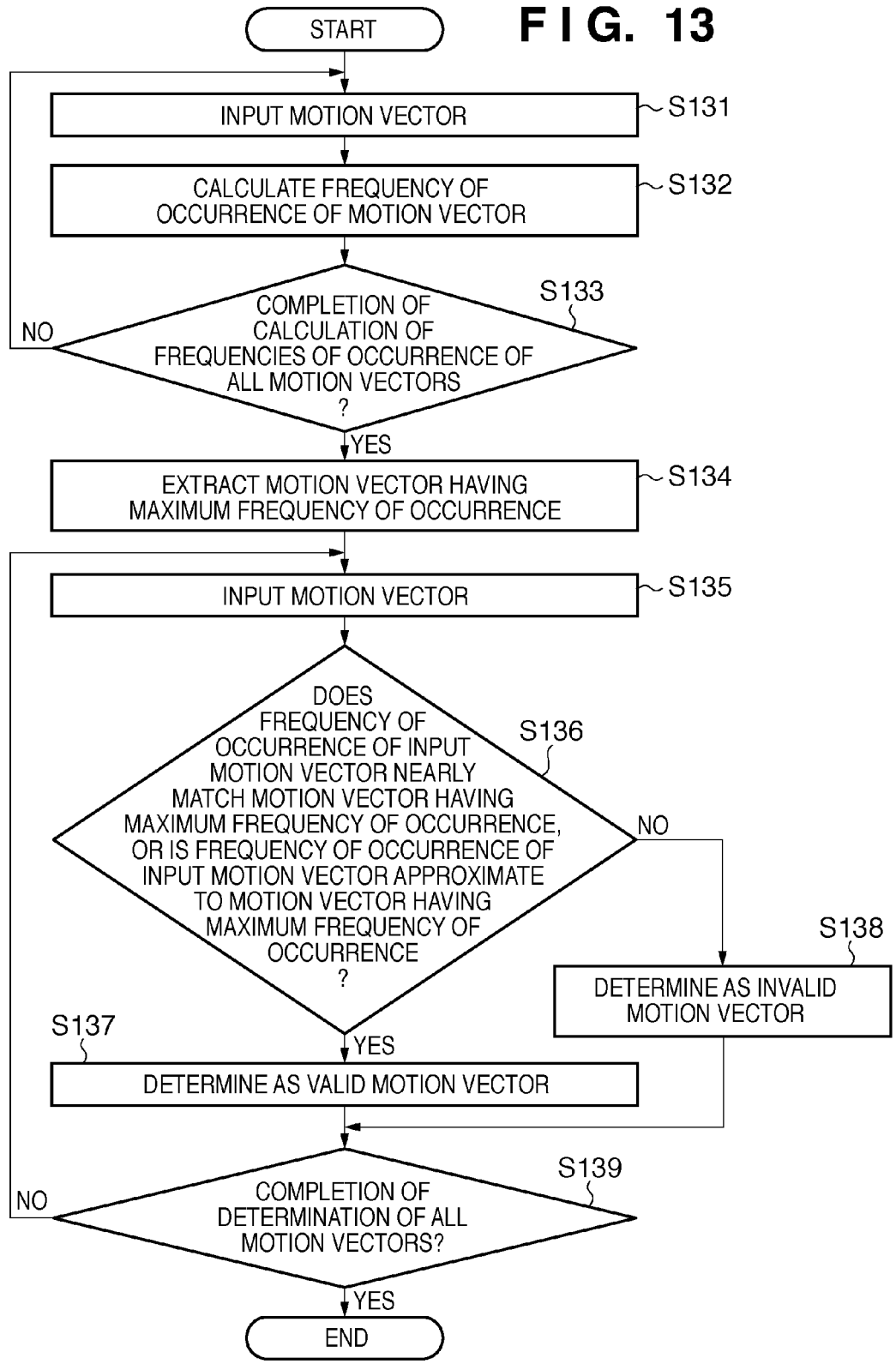
FIG. 13 is a flowchart for explaining a valid motion vector determination method.

FIG. 13 is a flowchart for explaining the valid motion vector determination method (S114). The moving amount calculation unit 112 inputs a motion vector of a block (S131), and calculates the frequency of occurrence of the input motion vector (S132). Then, the unit 112 repeats steps S131 and S132 until it is determined in step S133 that the calculations of the frequencies of occurrence of all the detected motion vectors are complete.

Upon completion of the calculations of the frequencies of occurrence of the motion vectors, the moving amount calculation unit 112 extracts a motion vector having a maximum frequency of occurrence (S134). Then, the unit 112 inputs the motion vector again (S135), and determines whether or not the input motion vector nearly matches or is approximate to the motion vector having the maximum frequency of occurrence (S136). In case of only a shift blur, the motion vectors of respective blocks roughly match the motion vector having the maximum frequency of occurrence. In case of including a rotation blur, many motion vectors approximate to the motion vector having the maximum frequency of occurrence occur. Therefore, the unit 112 records, as a valid motion vector, the motion vector which roughly matches or is approximate to the motion vector having the maximum frequency of occurrence (S137). Conversely, the unit 112 records a motion vector which is sufficiently different from the motion vector having the maximum frequency of occurrence as an invalid motion vector (S138). Note that a difference between vector magnitudes or an angle difference may be set based on empirical values as a criterion for a valid or invalid motion vector.

The moving amount calculation unit 112 repeats steps S135 to S138 until it is determined in step S139 that valid or invalid motion vectors are judged for all the detected motion vectors.

In this way, by combining the image stabilization using the deconvolution operations, and by synthesizing a plurality of images, complicated blurs as a combination of a blur caused by camera shaking and a motion blur of object can be corrected.

Second Embodiment

Image processing according to the second embodiment of the present invention will be described below. Note that the same reference numerals in the second embodiment denote the same components as those in the first embodiment, and a detailed description thereof will not be repeated.

The first embodiment has exemplified the case in which the predetermined exposure control is used to control the opening and closing timings of the fluttered shutter of the image capturing apparatus. The second embodiment will exemplify a case in which an exposure condition of an image capturing apparatus is controlled in accordance with an imaging environment.

Figure 14:
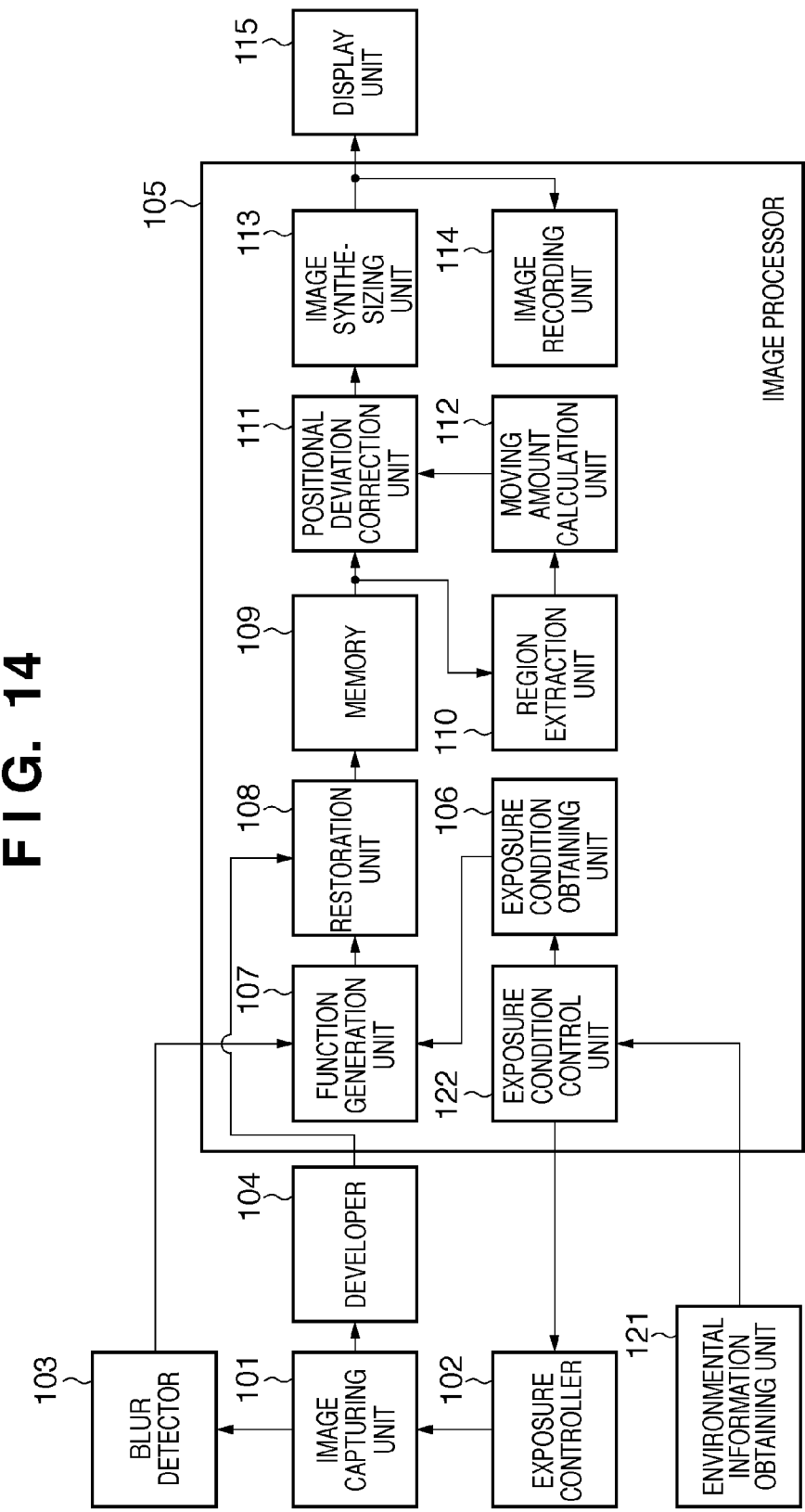
FIG. 14 is a block diagram showing the arrangement of an image capturing apparatus according to the second embodiment.

FIG. 14 is a block diagram showing the arrangement of the image capturing apparatus of the second embodiment. The image capturing apparatus of the second embodiment includes an environmental information obtaining unit 121 and an exposure condition control unit 122 in addition to the arrangement of the image capturing apparatus of the first embodiment.

The exposure condition control unit 122 determines an exposure condition according to information of an imaging environment obtained by the environmental information obtaining unit 121, and notifies an exposure controller 102 and an exposure condition obtaining unit 106 of the determined exposure condition. That is, the exposure timings of a shutter of the image capturing apparatus change according to the imaging environment, and restoration processing as the former half processing of image stabilization is different from the first embodiment. Therefore, the restoration processing of the second embodiment will be described below, and a description of synthesizing processing as the latter half processing of the image stabilization will not be repeated.

Figure 15:
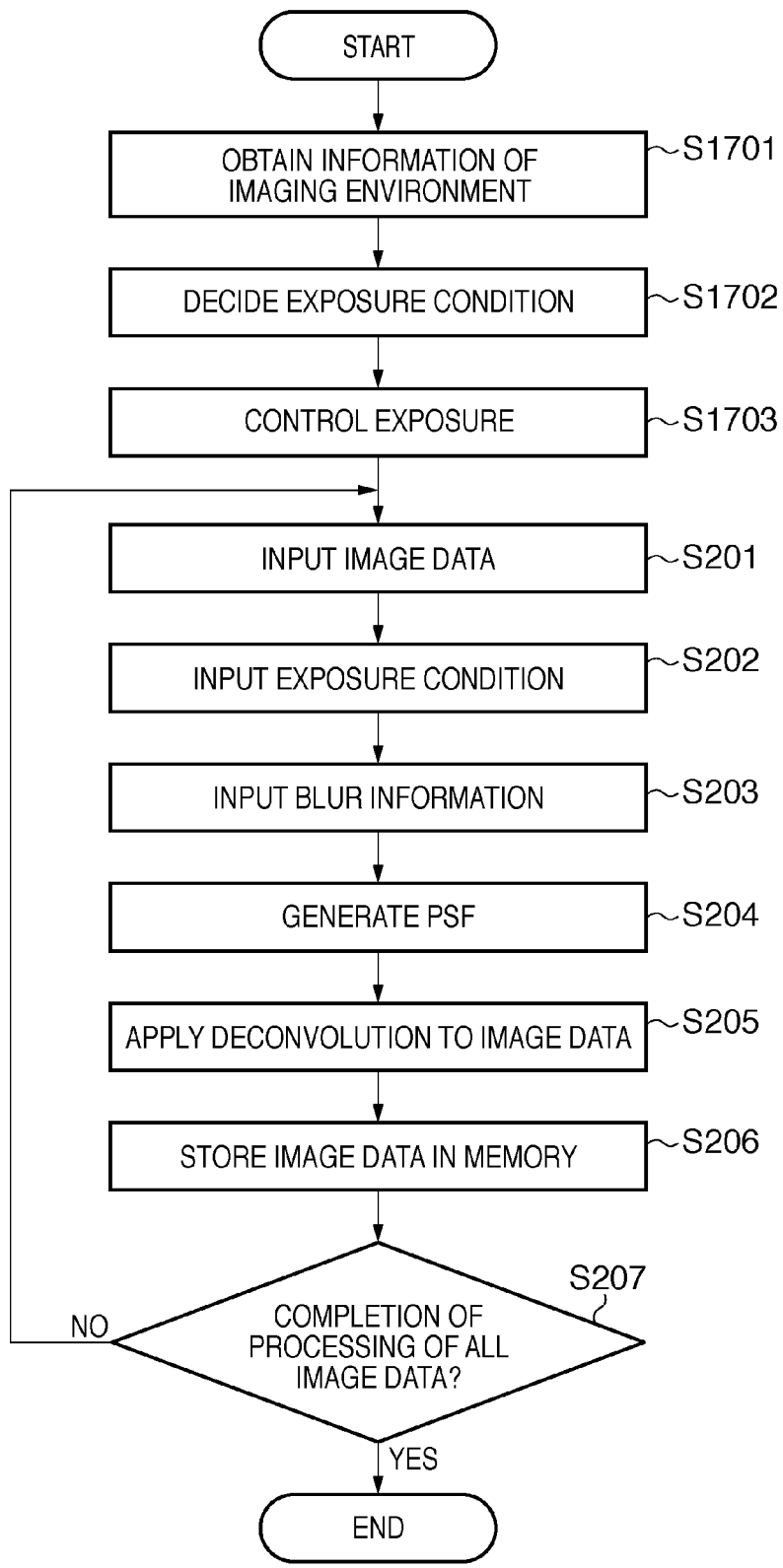
FIG. 15 is a flowchart for explaining restoration processing.

FIG. 15 is a flowchart for explaining the restoration processing. The environmental information obtaining unit 121 obtains information of an imaging environment such as a light amount in an environment of an object (S1701). The exposure condition control unit 122 determines an exposure condition according to the information of the imaging environment obtained by the environmental information obtaining unit 121 (S1702). When the light amount in the environment of the object is small, the exposure condition control unit 122 selects an opening and closing pattern for a fluttered shutter, as shown in FIG. 5A, so as to control the exposure condition. On the other hand, when the light amount in the environment of the object is sufficient, the unit 122 selects a continuously shutter open pattern during a shutter open period (to be referred to as normal exposure hereinafter), as shown in FIG. 4A, so as to control the exposure condition. The exposure condition control unit 122 notifies the exposure controller 102 and the exposure condition obtaining unit 106 of the determined exposure condition, thus controlling an exposure operation of the image capturing apparatus (S1703). After that, since the same processes as those in step S201 and subsequent steps of the first embodiment shown in FIG. 3 are executed, a detailed description thereof will not be repeated.

When a light amount in an imaging environment of an object is small, the light amount which enters an image capturing device is reduced, and noise caused by dark currents of the image capturing device is superposed on a captured image. In order to reduce this noise, it is desired to set a relatively long exposure time. However, when a long exposure time is set, a blur readily occurs, and the image stabilization using the fluttered shutter shown in FIG. 5A is effective. On the other hand, when the light amount in an imaging environment of an object is sufficient, an image is hardly influenced by noise if a short exposure time is set. Therefore, the normal exposure exemplified in FIG. 4A is selected to shorten an exposure time required to capture each image.

Figure 16:
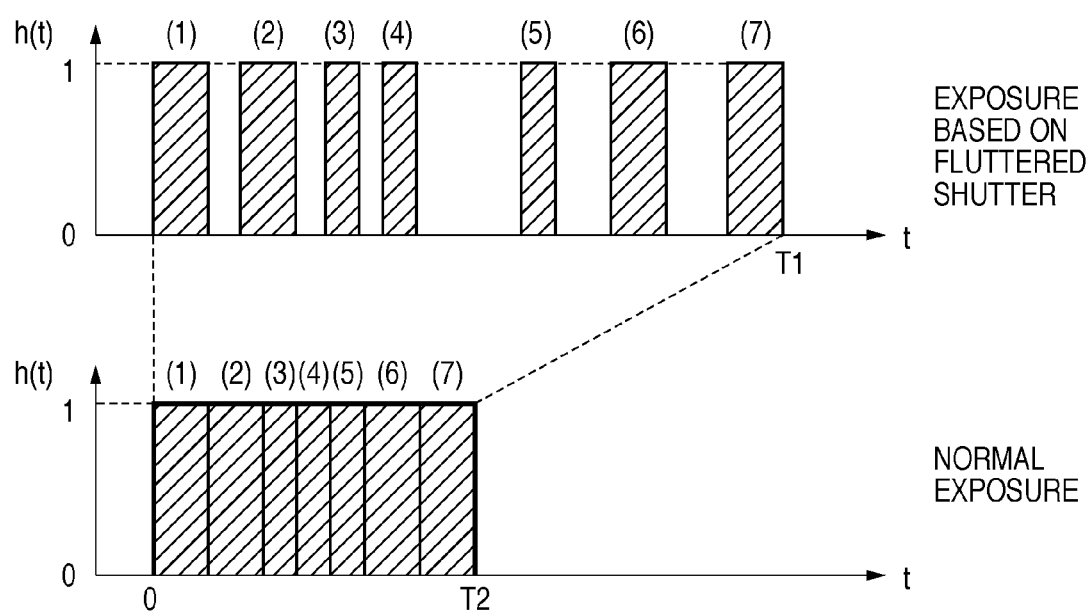
FIG. 16 is a graph showing a difference between an exposure condition h(t) of a fluttered shutter and an exposure condition h(t) of normal exposure when their total shutter open times are equal to each other.

FIG. 16 shows a difference between an exposure condition h(t) of the fluttered shutter and an exposure condition h(t) of the normal exposure when their total shutter open times are equal to each other. The normal exposure does not include any shutter close timing upon capturing one image. On the other hand, since an exposure operation based on the fluttered shutter repeats to open and close the shutter, its exposure period T1 becomes longer than an exposure period T2 of the normal exposure. Therefore, the normal exposure which completes an imaging operation within a relatively short period of time allows relatively easy image stabilization, since the degree of blur is relatively small even if the blur occurs.

Figure 17A:
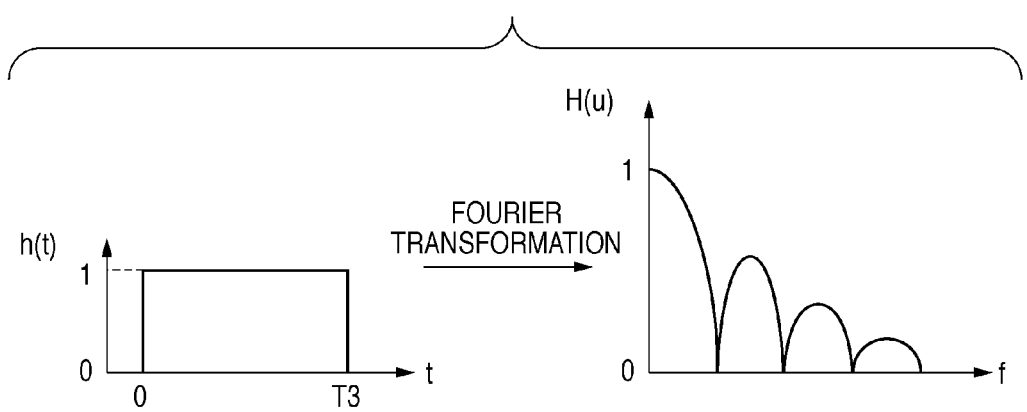
FIGS. 17A and 17B are graphs showing a PSF shape when an exposure time is changed in normal exposure.
Figure 17B:
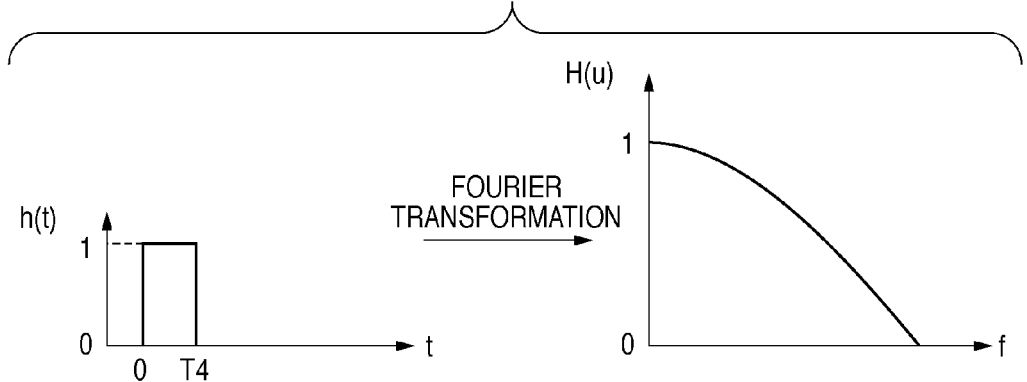

FIGS. 17A and 17B show PSF shapes when the exposure time is changed in the normal exposure. In FIG. 17B in which an exposure time is set to be shorter than FIG. 17A, nearly no zero point is generated in the PSF of the exposure condition h(t), and an image free from omissions of frequency components can be obtained. Note that a deconvolution algorithm can use an arbitrary existing algorithm, as described above.

Figure 18:
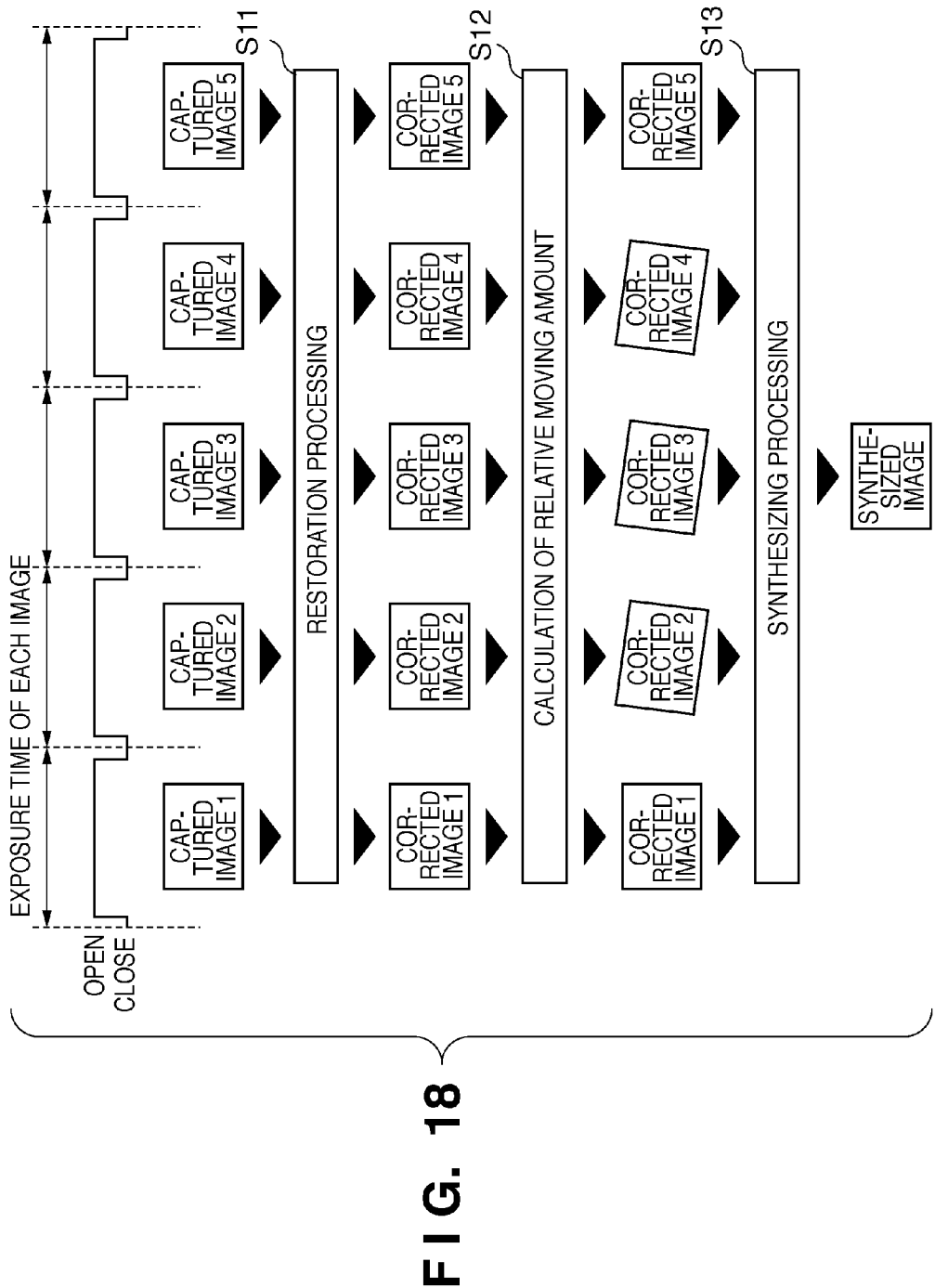
FIG. 18 is a view for explaining an overview of image stabilization when a light amount in an imaging environment of an object is sufficient.

FIG. 18 is a view for explaining an overview of image stabilization when the light amount in an imaging environment of an object is sufficient. Initially, restoration processing is applied to each of a series of images captured by the normal exposure (S11). Next, relative moving amounts indicating positional deviations between the images which have undergone the image stabilization are calculated (S12). Then, the positional deviations of the respective images which have undergone the image stabilization are corrected based on the relative moving amounts, and the images are synthesized to attain detailed image stabilization (S13).

Figure 19:
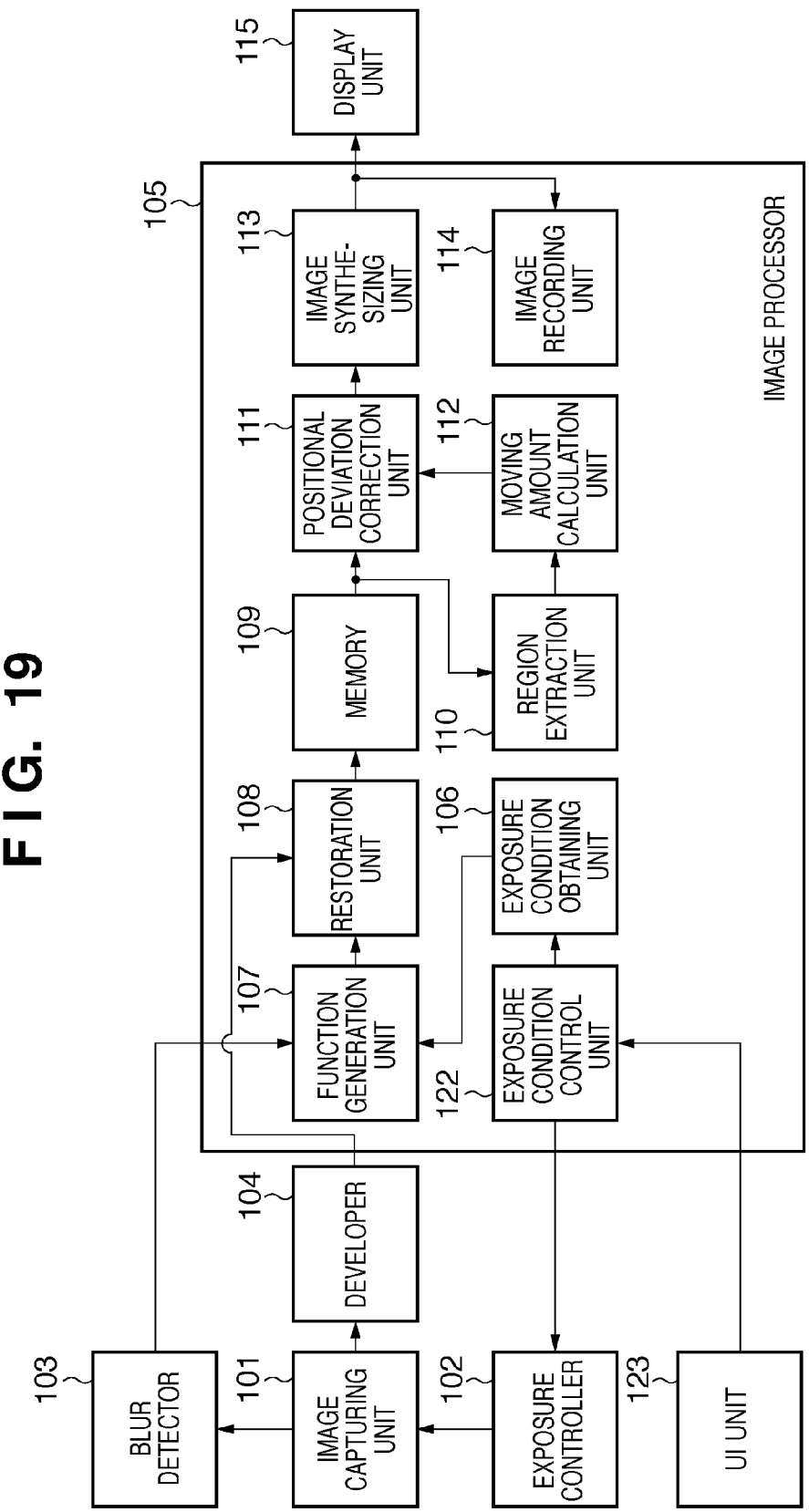
FIG. 19 is a block diagram showing another arrangement of the image capturing apparatus according to the second embodiment.

FIG. 19 is a block diagram showing another arrangement of the image capturing apparatus of the second embodiment. The above description has exemplified the case in which the exposure condition is controlled according to information of an imaging environment. Alternatively, the user may select or control the exposure condition via a user interface. The arrangement shown in FIG. 19 includes a UI unit 123 which provides a user interface in place of the environmental information obtaining unit 121.

The user inputs information indicating a sufficient or deficient light amount of an imaging environment. Alternatively, the user may select an imaging operation based on the fluttered shutter or normal exposure via the UI unit 123. The exposure condition control unit 122 sets an exposure condition according to the information input via the UI unit 123, and notifies the exposure controller 102 and the exposure condition obtaining unit 106 of the set exposure condition, thereby controlling an exposure operation of the image capturing apparatus.

In this way, by obtaining information of an imaging environment or inputting a user instruction, the exposure condition can be controlled to that suited to the imaging environment, and a stabilized image can be obtained by shortening an imaging time and suppressing noise.

Third Embodiment

Image processing according to the third embodiment of the present invention will be described below. Note that the same reference numerals in the third embodiment denote the same components as those in the first and second embodiments, and a detailed description thereof will not be repeated.

The second embodiment has exemplified the case in which one of exposure operations based on the fluttered shutter and normal exposure is selected according to information of an imaging environment or a user instruction. However, the exposure operation based on the fluttered shutter and the normal exposure operation may be combined to capture a plurality of images.

An exposure condition control unit 122 can control a shutter in, for example, three stages in accordance with information of an imaging environment obtained by an environmental information obtaining unit 121 or a user instruction input via a UI unit 123. For example, the light amount E of an imaging environment is compared with a first threshold Th1 and second threshold Th2 (Th1<Th2). When E≦Th1 (deficient light amount), the fluttered shutter is applied to capture respective images, as shown in FIG. 2. On the other hand, when Th2<E (sufficient light amount), the normal exposure operation is applied to capture respective images, as shown in FIG. 18. In case of an intermediate light amount (Th1<E≦Th2), an exposure controller 102 is controlled to capture respective images by combining the exposure operation based on the fluttered shutter and the normal exposure operation, as will be described later.

Figure 20:
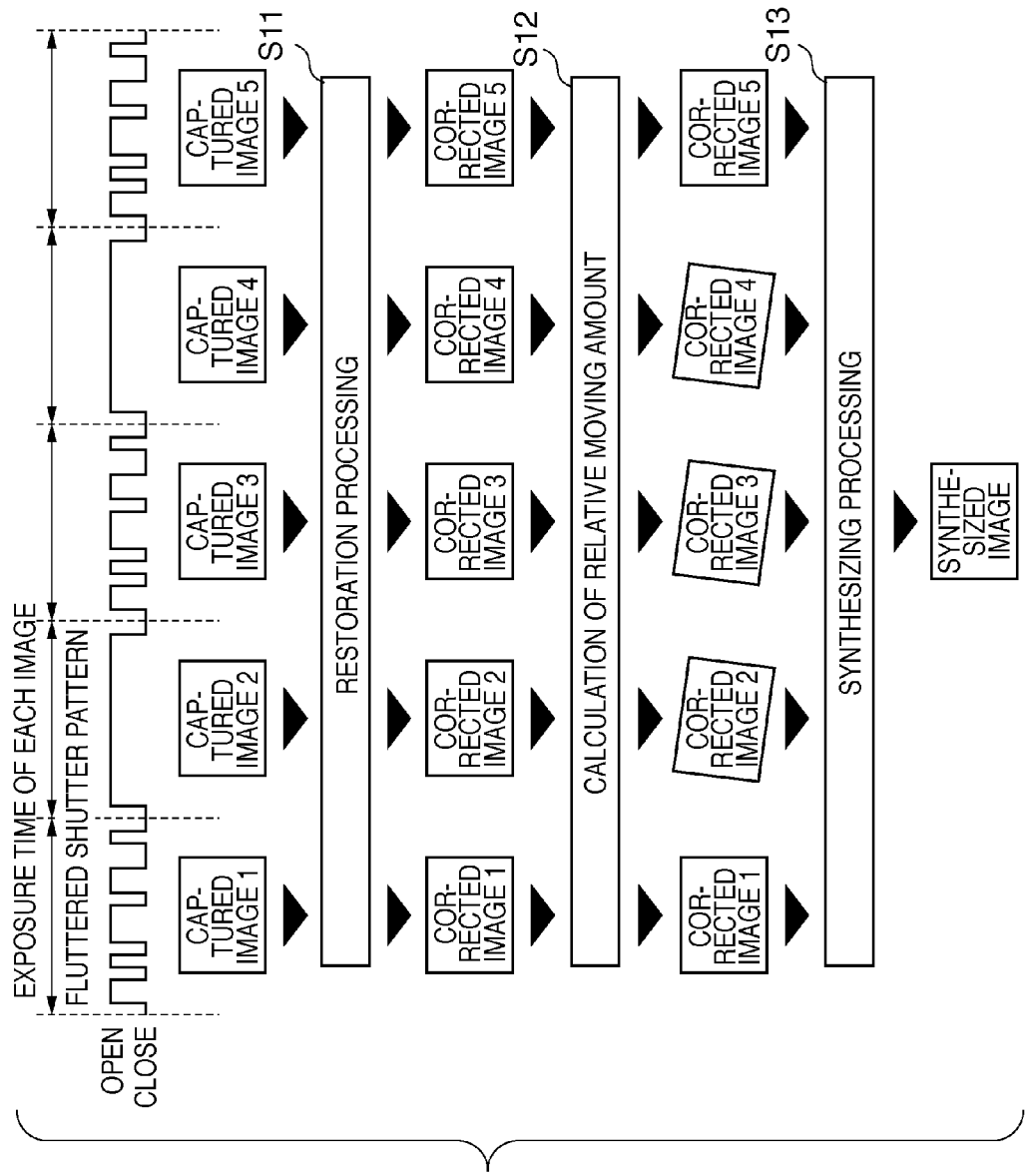
FIG. 20 is a view for explaining an overview of image stabilization when a light amount in an imaging environment of an object is intermediate.

FIG. 20 is a view for explaining an overview of image stabilization when a light amount in an imaging environment of an object is intermediate. Initially, restoration processing is applied to each of a series of images alternatively captured by the exposure operation based on the fluttered shutter and the normal exposure operation (S11). Next, relative moving amounts indicating positional deviations between images that have undergone the image stabilization are calculated (S12). Then, the positional deviations of the respective images that have undergone the image stabilization are corrected based on the relative moving amounts, and the corrected images are synthesized to attain detailed image stabilization (S13).

Upon execution of the image stabilization shown in FIG. 20, when relative moving amounts are to be calculated based on images that have undergone the restoration processing, relative moving amounts of only images captured by the exposure operation based on the fluttered shutter (corrected images 1, 3, and 5 in the example of FIG. 20) may be calculated. Then, relative moving amounts of images captured by the normal exposure operation (corrected images 2 and 4 in the example of FIG. 20) can be calculated by interpolation from those of the corrected images, which are captured by the exposure operation based on the fluttered shutter before and after those images. For example, the relative moving amount of the corrected image 2 in FIG. 20 is calculated by interpolation from those of the corrected images 1 and 3. Of course, the relative moving amount of the corrected image 2 may be calculated by interpolation from those of all the corrected images captured by the exposure operation based on the fluttered shutter (corrected images 1, 3, and 5 in the example of FIG. 20).

Other Embodiments

Aspects of the present invention can also be realized by a computer of a system or apparatus (or devices such as a CPU or an MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145826, filed Jun. 18, 2009, which is hereby incorporated by reference herein in its entirety.

What is claimed is:

1. An image processing apparatus comprising:
   an input section, configured to input a plurality of images captured by an image capturing unit;
   a restoration unit, configured to correct image blur of each of the plurality of images by coded exposure processing;
   a calculator, configured to calculate relative moving amounts between the plurality of deblurred images obtained by said restoration unit; and
   a synthesizing unit, configured to correct positions of the plurality of deblurred images based on the calculated relative moving amounts, and to synthesize the plurality of images on which the position correction is performed.

2. The apparatus according to claim 1, further comprising:
   an obtaining section, configured to obtain information of an imaging environment; and
   a controller, configured to control an exposure condition of the image capturing unit based on the information of the obtained imaging environment.

3. The apparatus according to claim 2, wherein said controller sets one of an exposure operation based on a fluttered shutter and a normal exposure operation as the exposure condition based on the information of the imaging environment.

4. The apparatus according to claim 3, wherein when the information of the imaging environment indicates a deficient light amount, said controller sets the exposure operation based on the fluttered shutter as the exposure condition.

5. The apparatus according to claim 3, wherein when the information of the imaging environment indicates a sufficient light amount, said controller sets the normal exposure operation as the exposure condition.

6. The apparatus according to claim 3, wherein when the information of the imaging environment indicates an intermediate light amount between a deficient light amount and a sufficient light amount, said controller sets the exposure operation based on the fluttered shutter and the normal exposure operation as the exposure condition, and controls the image capturing unit to execute image capturing operations including both an image capturing operation based on the fluttered shutter and an image capturing operation based on the normal exposure operation.

7. An image processing method comprising:
   using a processor to perform the steps of:
      inputting a plurality of images captured by an image capturing unit;
      correcting image blur of each of the plurality of images by coded exposure processing;
      calculating relative moving amounts between the plurality of deblurred images obtained in the correcting step; and
      correcting positions of the plurality of deblurred images based on the calculated relative moving amounts, and synthesizing the plurality of images on which the position correction is performed.

8. A non-transitory computer-readable medium storing a computer-executable program for causing a computer to perform an image processing method, the method comprising the steps of:
   inputting a plurality of images captured by an image capturing unit;
   correcting image blur of each of the plurality of images by coded exposure processing;
   calculating relative moving amounts between the plurality of deblurred images obtained in the correcting step; and
   correcting positions of the plurality of deblurred images based on the calculated relative moving amounts, and synthesizing the plurality of images on which the position correction is performed.

* * * * *